(12) United States Patent
Kim

(10) Patent No.: US 10,195,801 B2
(45) Date of Patent: Feb. 5, 2019

(54) POLARIZED LENS FILM PRODUCTION APPARATUS AND METHOD

(71) Applicant: Choong Deuk Kim, Gyeonggi-do (KR)

(72) Inventor: Choong Deuk Kim, Gyeonggi-do (KR)

( * ) Notice: Subject to any disclaimer, the term of this patent is extended or adjusted under 35 U.S.C. 154(b) by 217 days.

(21) Appl. No.: 15/192,736

(22) Filed: Jun. 24, 2016

(65) Prior Publication Data

US 2016/0303810 A1 Oct. 20, 2016

Related U.S. Application Data

(63) Continuation of application No. PCT/KR2014/011047, filed on Nov. 18, 2014.

(30) Foreign Application Priority Data

Dec. 26, 2013 (KR) ........................ 10-2013-0164419

(51) Int. Cl.
| | |
|---|---|
| B29D 11/00 | (2006.01) |
| B29C 55/02 | (2006.01) |
| G02B 5/30 | (2006.01) |
| B29C 31/00 | (2006.01) |
| B29C 35/04 | (2006.01) |

(Continued)

(52) U.S. Cl.
CPC ...... *B29D 11/00788* (2013.01); *B29C 31/008* (2013.01); *B29C 35/049* (2013.01); *B29C 55/02* (2013.01); *B29C 69/001* (2013.01); *B29D 11/0073* (2013.01); *B29D 11/00644* (2013.01); *B29D 11/00932* (2013.01); *B65G 17/063* (2013.01); *G02B 5/30* (2013.01); *G02B 5/3025* (2013.01); *G02C 7/12* (2013.01); *B29K 2029/04* (2013.01); *B29K 2105/256* (2013.01); *B29L 2011/0066* (2013.01); *G02B 1/08* (2013.01); *G02B 5/305* (2013.01); *G02B 5/3033* (2013.01)

(58) Field of Classification Search
CPC .......... B29D 11/00644; B29D 11/0073; B29D 11/00788; B29C 35/049; G02B 1/08; G02B 5/30; G02B 5/3033; G02B 5/305; B02C 7/12
USPC ....... 264/1.34, 2.7, 1.32; 425/404, 446, 383, 425/397
See application file for complete search history.

(56) References Cited

U.S. PATENT DOCUMENTS

| | | | | |
|---|---|---|---|---|
| 2007/0058253 A1* | 3/2007 | Aiiso | ............ | B29D 11/0073 359/485.03 |
| 2008/0314499 A1* | 12/2008 | Begon | ............ | B29C 63/0073 156/64 |
| 2011/0194179 A1* | 8/2011 | Hsu | ............ | B29D 11/00634 359/465 |

* cited by examiner

*Primary Examiner* — Seyed Masoud Malekzadeh
*Assistant Examiner* — Lawrence D. Hohenbrink, Jr.
(74) *Attorney, Agent, or Firm* — Mintz Levin Cohn Ferris Glovsky and Popeo, P.C.; Kongsik Kim; Jhongwoo Jay Peck

(57) ABSTRACT

Disclosed herein is a polarized lens film production apparatus, which may include a humidification heat treatment part which is configured to transfer a film engaged to a ring-shaped fixing jig and heat-treat it under a humidification environment and elongate the exposed film at a center portion of the fixing jig; a forming part which is able to form at a predetermined curvature the elongated film by inserting a forming jig into the fixing jig which is configured to fix the film; a heat treatment part which is configured to harden the film by means of a heat treatment, while transferring the fixing jig configured to fix the film and the forming jig engaged to the fixing jig; and a cutting part which is (Continued)

provided to remove unnecessary portions by cutting the film, thus obtaining a polarizing lens film having a predetermined curvature.

11 Claims, 6 Drawing Sheets

(51) Int. Cl.
*B29C 69/00* (2006.01)
*B65G 17/06* (2006.01)
*G02C 7/12* (2006.01)
*G02B 1/08* (2006.01)
*B29K 29/00* (2006.01)
*B29K 105/00* (2006.01)
*B29L 11/00* (2006.01)

POLARIZED LENS FILM PRODUCTION APPARATUS AND METHOD

CROSS-REFERENCE TO RELATED APPLICATIONS

This application is a continuation application of International Application No. PCT/KR2014/011047 filed on Nov. 18, 2014, which claims priority to Korean Application No. 10-2013-0164419 filed on Dec. 26, 2013, which applications are incorporated herein by reference.

TECHNICAL FIELD

The present invention relates to a polarized lens film production apparatus and method, and in particular to a polarized lens film production apparatus and method the thickness of which is smaller than 0.04 mm.

BACKGROUND ART

A functional film, in general, is laminated on the surface of an ophthalmic lens, for example, a lens for glasses, a contact lens, etc. The lamination method may be carried out by a method, for example, a transcription, a formation, etc.

As a method for forming a film on the surface of an ophthalmic lens, there is the Korean patent registration method No. 10-1283459 (registered on Jul. 2, 2013, a forming apparatus of a flat film on an optical lens, a functionalization method of an optical lens by this forming apparatus, and an optical lens).

As for the contents of the aforementioned registered patent, it is employing a method wherein a flexible flat film is directly attached to the surface of a lens, and the flexible flat film is deformed to match with the curvature of a lens by supplying pressure, whereupon it can be consequently attached to the front surface of the lens.

To this end, there are provided a mechanical piston which carries out a vertical translational motion, a module equipped with a plate engaged to the top of the mechanical piston, an anti-return device for limiting the height of the plate in the module, a lens holder for fixing an optical lens at the top of the plate, a film carrier for fixing the film at the top of the lens holder, a stamp which is laid vertical at the module, and a mechanical translational unit which allows the stamps to carry out a vertical and horizontal motion. In this configuration, a pressure can be supplied until the flat film can contact at equal angles with the lens with the aid of a relative motion between the stamp and the mechanical piston, by means of which the flat film can be attached to the surface of the lens which has a predetermined curvature.

In the aforementioned method, it is impossible to guarantee that all portions of a film can elongate at the same elongation percentages and can convert into a film having a predetermined curvature depending on a pressure condition and a film state during a procedure where a flexible flat film is converted into a flexible film having a predetermined curvature in such a way to directly press the flexible flat film on a lens having a predetermined curvature. For this reason, the reliability of a product may be degraded, and yield may be lowered.

In the aforementioned conventional apparatus, since a flexible plan film should be attached to every lens one by one, a mass production is not available.

SUMMARY

The present invention has been made in an effort to solve the above-described problems associated with prior art. It is an object of the present invention to provide a polarized lens film production apparatus and method by which a flexible flat film can have an even elongation percentage.

It is another object of the present invention to provide a polarized lens film production apparatus and method which make it possible to easily manufacture a polarizing lens film having a thickness of below 0.04 mm by increasing the elongation percentage of a flexible flat film, if necessary.

It is further another object of the present invention to provide a polarized lens film production apparatus and method which are advantageous to mass production while minimizing the installation area of the apparatus.

To achieve the above objects, there is provided a polarized lens film production apparatus, which may include a humidification heat treatment part which is configured to transfer a film engaged to a ring-shaped fixing jig and heat-treat it under a humidification environment and elongate the exposed film at a center portion of the fixing jig; a forming part which is able to form at a predetermined curvature the elongated film by inserting a forming jig into the fixing jig which is configured to fix the film treated by the humidification heat treatment part; a heat treatment part which is configured to harden the film by means of a heat treatment, while transferring the fixing jig configured to fix the film and the forming jig engaged to the fixing jig; and a cutting part which is provided to remove unnecessary portions by cutting the film, thus obtaining a polarizing lens film having a predetermined curvature.

To achieve the above objects, there is provided a polarized lens film production method, which may include a step (a) wherein a film is fixed at a ring-shaped fixing jig, and an upper portion and a lower portion thereof are exposed at a center portion of the fixing jig; a step (b) wherein the fixing jig which has fixed the film, is subjected to a humidification heat treatment under a relative humidity environment of 90 to 100% and at a temperature of 30 to 40° C. and subsequently is elongated; a step (b) wherein a forming jig is engaged to the center portion of the fixing jig which has fixed the film which has been subjected to the humidification heat treatment, and the elongated film is formed to have a predetermined curvature; a step (c) wherein an assembly formed of the fixing jig for fixing the formed film, and the forming jig is heat-treated at a temperature of 50 to 70°, thus drying and hardening the formed film; and a step (d) wherein a film which has a predetermined curvature and is to be attached to the surface of a polarizing lens, is obtained in such a way to cut the dried and hardened film.

In the polarized lens film production apparatus and method according to the present invention, a heat treatment is carried out under a humidification environment in a state where a flat film is fixed by a circular jig, by which the portions not fixed at an inner side of the jig can elongate by moisture and heat, and the elongated portions are pressed by a pressing part having a predetermined curvature and then are heat-treated. The thusly prepared flat film is formed to match with the curvature of the polarizing lens and then is attached to the polarizing lens. This method may make it possible to obtain an even elongation percentage as compared to the method wherein a flat film directly contacts close with the surface of the polarizing lens and is attached thereto, thus preventing any product defects.

Moreover, a heat treatment or a procedure for heat treatments with respect to a plurality of films can be continuously carried out under a humidification environment, which may be advantageous to mass productions, while minimizing the area of an apparatus.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DETAILED DESCRIPTION

In the best modes for carrying out the invention, there is provided a polarized lens film production apparatus, which may include a humidification heat treatment part which is configured to transfer a film engaged to a ring-shaped fixing jig and heat-treat it under a humidification environment and elongate the exposed film at a center portion of the fixing jig; a forming part which is able to form at a predetermined curvature the elongated film by inserting a forming jig into the fixing jig which is configured to fix the film treated by the humidification heat treatment part; a heat treatment part which is configured to harden the film by means of a heat treatment, while transferring the fixing jig configured to fix the film and the forming jig engaged to the fixing jig; and a cutting part which is provided to remove unnecessary portions by cutting the film, thus obtaining a polarizing lens film having a predetermined curvature, wherein the humidification heat treatment part which may include a moving part which is configured to move the fixing jig which has fixed the film in a treatment room; a humidification part which is able to keep the relative humidity in the treatment room at 90 to 100%; and a heater part which is able to keep the temperature of the treatment room at 30 to 40° C., wherein the moving part is configured to cause a step-by-step displacement in the horizontal direction by sequentially receiving the fixing jigs, and move upward or downward after the displacement in the horizontal direction has occurred, thus increasing a moving distance.

The polarized lens film production apparatus and method according to the present invention will be described with reference to the accompanying drawings.

Figure 1:
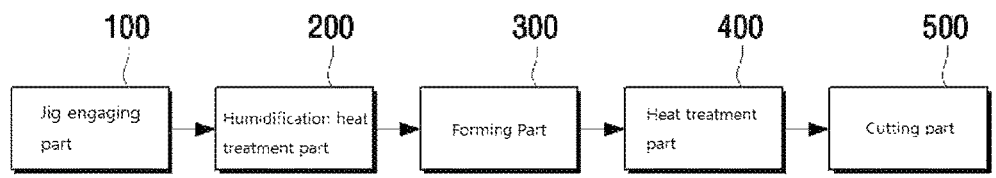
FIG. 1 is a view illustrating a block configuration of a polarized lens film production apparatus according to a preferred embodiment of the present invention.

FIG. 1 is a view illustrating a block configuration of a polarized lens film production apparatus according to a preferred embodiment of the present invention.

Referring to FIG. 1, a polarized lens film production apparatus according to a preferred embodiment of the present invention may include, but is not limited to, a jig engaging part 100 which is configured to engage a flexible flat film to a ring-shaped fixing jig, a humidification heat treatment part 200 which is able to elongate at a predetermined elongation percentage an exposed part of the film at an inner side of the ring-shaped fixing jig by heat-treating under a humidification environment while the fixing jig configured to fix the flexible flat film is being transferred, a forming part 300 which is configured to insert a forming jig into an inner diameter side of the ring-shaped fixing jig which has been heat-treated by the humidification heat treatment part 200 and form the elongated film to have a determined curvature, a heat treatment part 400 which is able to heat-treat the fixing jig to which the forming jig has been engaged in the forming part 300, thus contracting and hardening the film formed into a predetermined curvature, and a cutting part 500 which is configured to separate the film from the forming jig and the fixing jig and remove an unnecessary portion with the aid of laser, thus finishing a polarizing lens film.

The configuration and operation of the polarized lens film production apparatus according to a preferred embodiment of the present invention will be described.

Figure 2:
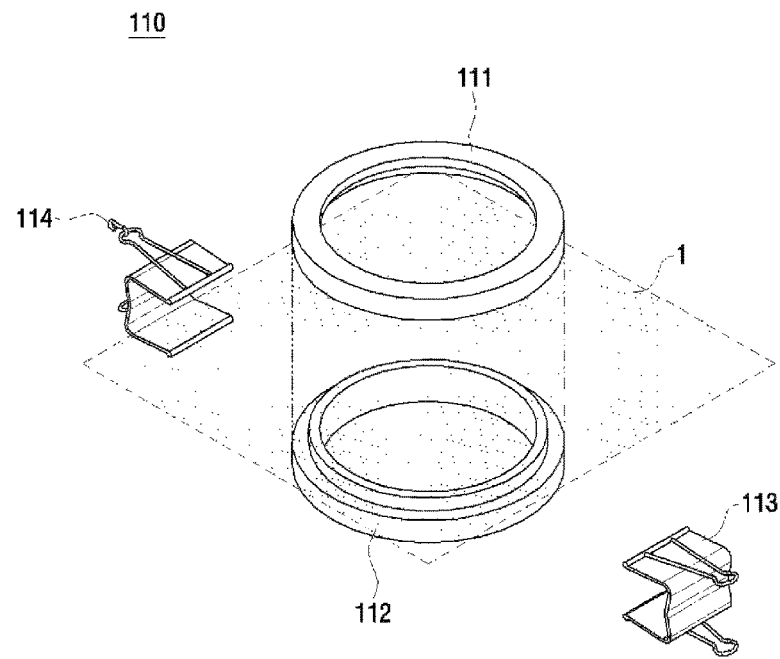
FIG. 2 is a separated perspective view illustrating a jig which belongs to a jig engaging part in FIG. 1.

FIG. 2 is a separated perspective view illustrating the fixing jig 110. The fixing jig 110 may include, but is not limited to, a ring-shaped upper part 111 at the lower surface of which steps are formed, a ring-shaped lower part 112 at the upper surface of which steps tooth-engaging with the steps of the lower surface of the upper part 111 are formed, a pair of clamps 113 employed to fix both edge sides of the upper part 111 and the lower part 112 in a state where a film 1 positions engaged between the upper part 111 and the lower part 112, and a ring part 114 which is connected to the clamps 113.

The flat film 1 can be fixed by the thusly constituted fixing jig 110. The film 1 can be exposed in upward and downward directions at the inner diameter portion of the ring-shaped fixing jig 110. Here, the exposed film 1 may become a state where it has been unfolded tight by the steps where the upper part 111 and the lower part 112 are tooth-engaged. The film 1 may be a polyvinyl alcohol (PVA).

The procedure for fixing the film 1 at the fixing jig 110 may be carried out manually by a worker or may be carried out automatically using a separate device.

In the jig engaging part 110, a heat treatment is carried out in the humidification environment in such a way to fix the film 1 at the fixing jig 110 and move the film 1 engaged to the fixing jig 110 to the humidification heat treatment part 200.

As for the internal humidity conditions of the humidification heat treatment part 200, a relative humidity is 90 to 100%, and a temperature condition is 30 to 40° C.

The film 1 which has been exposed at the inner diameter side of the fixing jig 110 by the aforementioned heat treatment, may elongate by humidity and temperature. Here, since the film 1 can elongate at an even elongate percentage, the whole thickness can become even.

Figure 3:
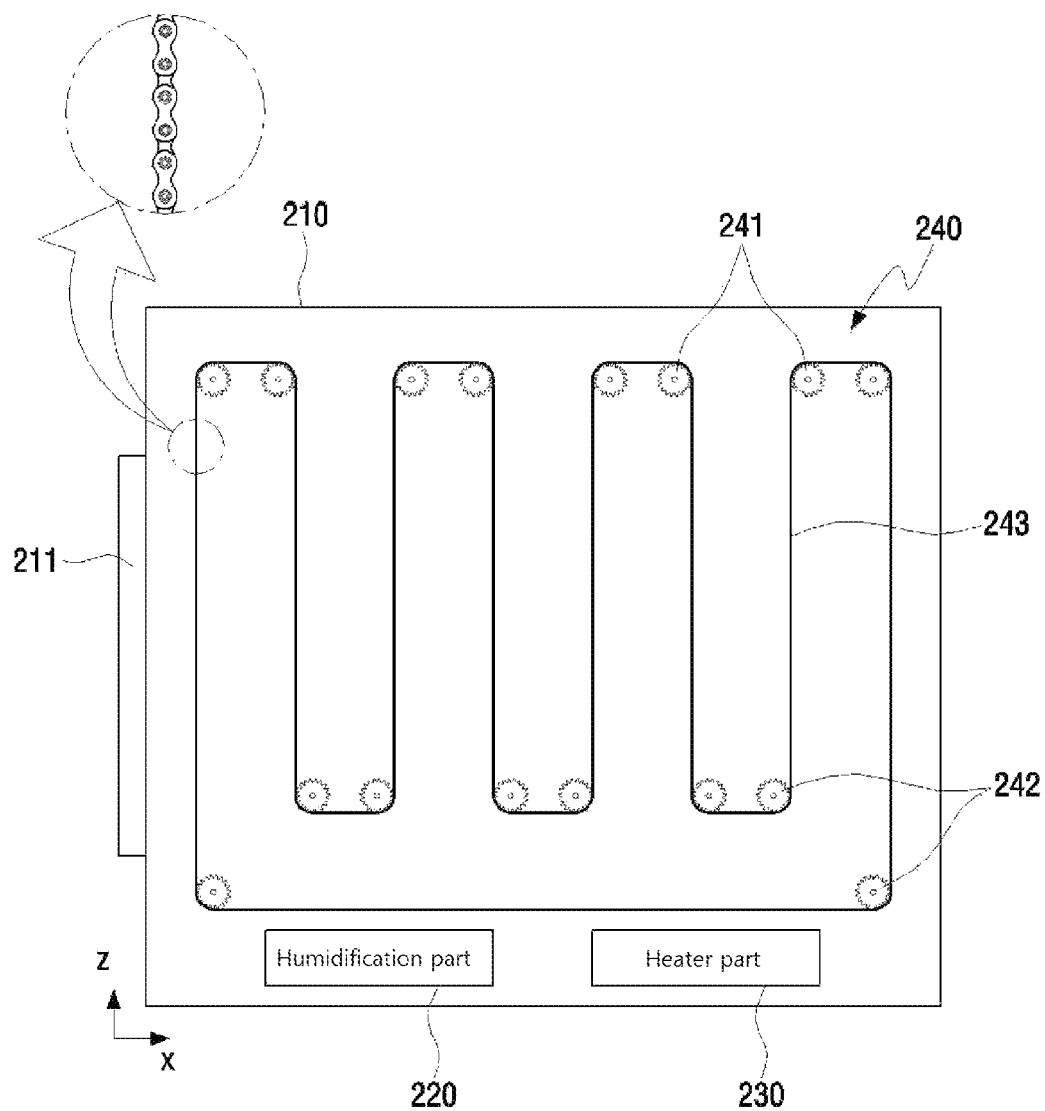
FIG. 3 is a schematic front view illustrating a humidification heat treatment part in FIG. 1.
Figure 4:
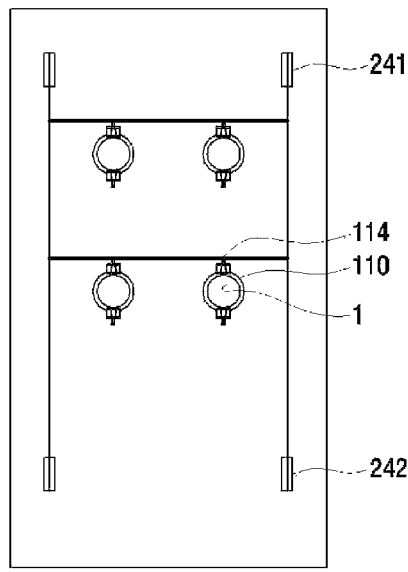
FIG. 4 is a side view illustrating a configuration in FIG. 3.

FIG. 3 is a schematic front view illustrating the humidification heat treatment part 200, and FIG. 4 is a view illustrating a part of the side configuration in FIG. 3.

Referring to FIGS. 3 and 4, the humidification heat treatment part 200 may include, but is not limited to, a treatment room 210 for blocking external air, a moving part 240 which is configured to move the fixing jig 110 configured to fix the film 1 in the treatment room 210 and repeatedly move upwardly and downwardly so as to reduce the area of the treatment room 210 and is able to move it in the horizontal direction, and a humidification part 220 and a heater part 230 which are disposed inside of the treatment room 210 so as to keep the relative humidity inside of each treatment room 210 at 90 to 100%, and the temperature at 30 to 40° C.

The treatment room 210 is equipped with a door 211. In the drawing, one door 211 is illustrated. The fixing jig 110 which is fixing the film 1, which will be treated, can be loaded into the treatment room 210 via the door 211 or the film which has been subjected to the humidification heat treatment, can be unloaded to the outside. The door 211 may be disposed at two facing sides of the treatment room 211, and the fixing jig 110 may be loaded via one side door, and the fixing jig 110 may be unloaded via the other side door.

The moving part 240 may be provided with a plurality of upper chain wheels 241 and a plurality of lower chain wheels 242, and a chain 243 may be connected with the lower chain wheels 242 and the upper chain wheels 241, and then it can be repeatedly connected from the upper chain wheels 241 to the lower chain wheels 242.

When viewing from their sides, the upper chain wheels 241 and the lower chain wheels 242 are disposed in pairs, respectively, at left and right sides, and the chains 243 may be disposed in pairs.

Moreover, both ends of the fixing bar 244 may be connected to a pair of the chains 243, so it can move together when the chain moves as the upper chain wheels 241 and the lower chain wheels 242 rotate.

It takes about 40 to 60 minutes under the aforementioned relative humidity and temperature conditions in order for the thickness of the film 1 fixed at the fixing jig 110 to become 0.03±0.005 mm as it elongates enough. Mass production may not be available if the humidification heat treatment is carried out in a state where the fixing jig 110 which has fixed the film 1, is not moved during the aforementioned time period. If the humidification heat treatment is carried out while moving it only in the horizontal direction, the area of the humidification heat treatment part 200 can increase much more. In this case, the installation may become hard in the limited indoor space.

In order to prevent the aforementioned problems, the moving part 240 of the present invention may be configured to repeatedly carry out the operation wherein the film 1 fixed at the fixing jig 110 is moved in the upward direction (z), and the in the moving direction (x), and is moved in the downward direction (-z), and then is moved in the moving direction (x).

After the fixing jig 110 has been moved up to the end of the moving direction (x), it is moved in the reverse direction (-x) in order for the fixing jig 110 to move toward the door 211 by means of a chain connected to the lower chain wheels 242 at the most front end and the most rear end of the moving direction (x). For this, the lower chain wheels 242 at the most front end and the most rear end may position lower as compared to the other lower chains wheels 241.

The aforementioned example is when the door 211 is one. If the door 211 is provided in pairs, it does not need to move the fixing jig 110 in the reverse direction (-x).

In the aforementioned configuration, the film 1 fixed at the fixing jig 110 can be continuously mounted on the moving part 240, whereby a humidification heat treatment can be carried out for enough time, and the size of the apparatus can be minimized.

More specifically, the moving part 240 may allow a step-by-step displacement in the horizontal direction by sequentially receiving the fixing jigs 110. It can be moved upward or downward after the displacement in the horizontal direction, thus increasing a moving distance, whereby a humidification heat treatment can be carried out for enough time.

If the humidification heat treatment is carried out in this way, the film 1 fixed at the fixing jig 110 can elongate from a tight state and may become sagged with wrinkles formed.

The fixing jig 110 configured to fix the film 1 which has been subjected to the humidification heat treatment, can be transferred to the forming part 300, and will be engaged with a forming jig 310 at the forming part 300, so the sagged film 1 can be formed and have a predetermined curvature.

Figure 5:
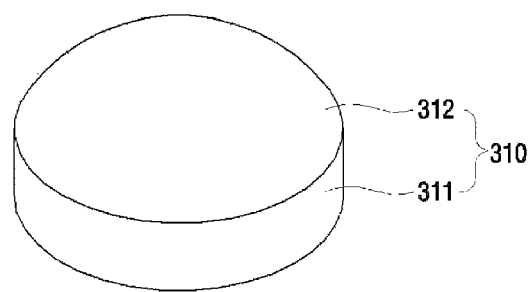
FIG. 5 is a view illustrating a configuration of a forming jig according to the present invention.
Figure 6:
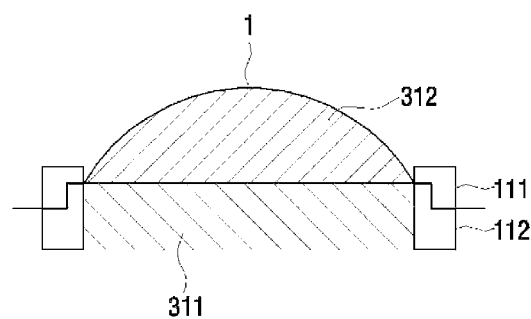
FIG. 6 is a cross sectional view illustrating an engaged state of a fixing jig and a forming jig according to the present invention.

FIG. 5 is a perspective view illustrating the forming jig, and FIG. 6 is a cross sectional view illustrating the forming jig which is engaged with the fixing jig.

Referring to FIGS. 5 and 6, the forming jig 310 may include, but is not limited to, an insertion part 311 which is inserted inside of the inner diameter part of the fixing jig 110, and a curvature part 312 which may position at the top of the insertion part 311 and may form the film 1 to have a predetermined curvature.

If the thusly constituted forming jig 310 is inserted into the film 1 exposed from an inner side of the fixing jig 110 and in the direction where the curvature part 312 contacts, the film 1 can be formed convex in the same shape as the curvature of the polarizing lens (not illustrated).

Next, the forming jig 310 is moved to the heat treatment part 400 in a state where it has been engaged to the fixing jig 110, and then is heat-treated. The internal temperature of the heat treatment part 400 is maintained at 50 to 70° C. for the film 1 to be dried and hardened closely attached to the curvature part 312.

Figure 7:
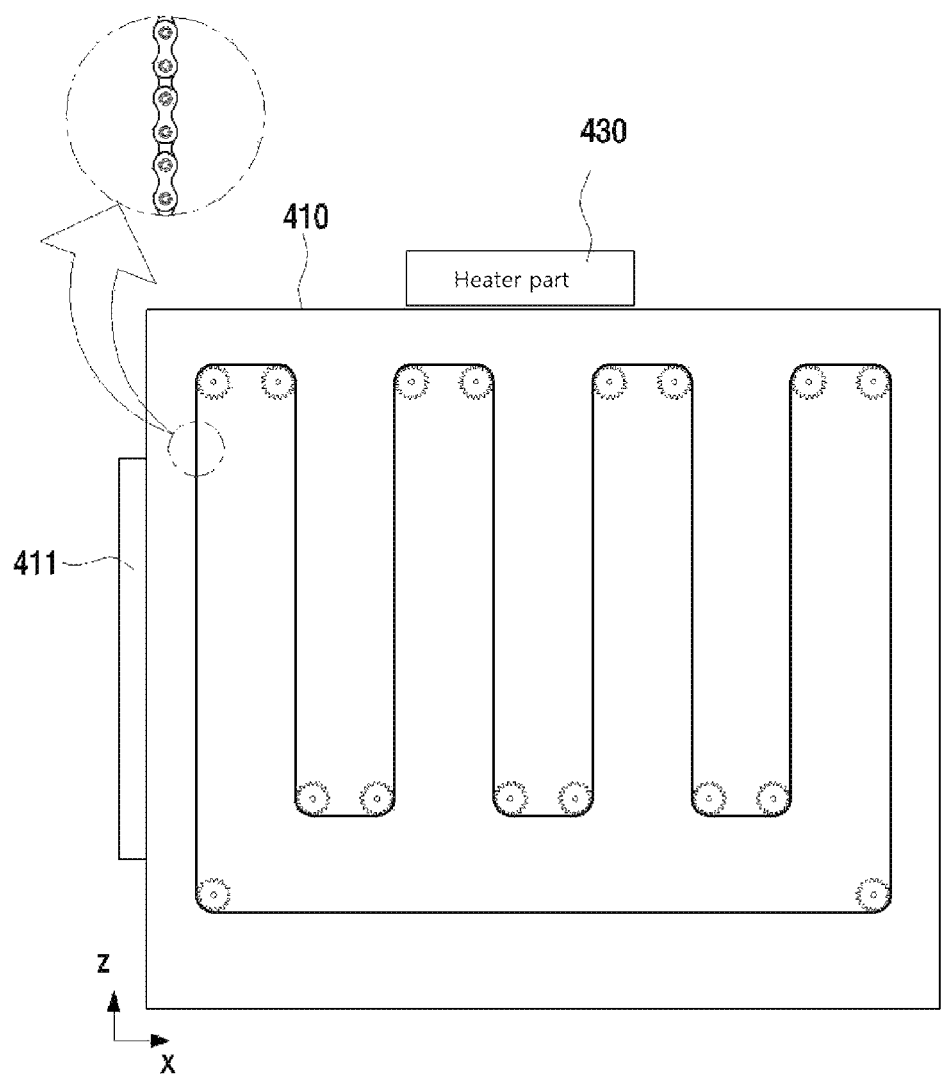
FIG. 7 is a view illustrating a heat treatment part according to the present invention.

FIG. 7 is a view illustrating a configuration of the heat treatment part 400.

Referring to FIG. 7, the heat treatment part 400 may include, but is not limited to, a treatment room 410 for blocking external air, a moving part 440 which is configured to move the fixing jig 110 configured to fix the film 1 in the treatment room 410 and move repeatedly upward and downward so as to reduce the area of the treatment room 410 and is able to move it in the horizontal direction, and a heater part 430 which is disposed at the top of the treatment room 410 and is able to keep the temperature inside of the treatment room 410 at 50 to 70° C.

The treatment room 410 is equipped with a door 411. In the drawing, one door 411 is illustrated. The fixing jig 410 which is fixing the film 1, which will be treated, can be loaded into the treatment room 410 via the door 411 or the film which has been subjected to the humidification heat treatment, can be unloaded to the outside. The door 411 may be disposed at two facing sides of the treatment room 411, and the fixing jig 110 may be loaded via one side door, and the fixing jig 110 may be unloaded via the other side door.

The thusly constituted heat treatment part 400 may be understood as the configuration which has been described in conjunction with FIGS. 3 and 4 and from which the humidification part 220 has been removed, so the descriptions on its operation will be omitted.

The film 1 which has been subjected to the heat treatment by the heat treatment part 400 may be a little contracted when it dries, so the film 1 can be attached close to the surface of the curvature part 312 of the forming jig 310.

The curvature 312 may have the same curvature as that of the polarizing film lens to which the film 1 is attached, and may be manufactured in a type where the film 1 can be easily attached to the polarizing lens.

The cutting part 500 is employed to separate the film 1 from the forming jig 310 and the fixing jig 110 and cut off unnecessary portions. The cutting method may be carried out using a laser.

Figure 8:
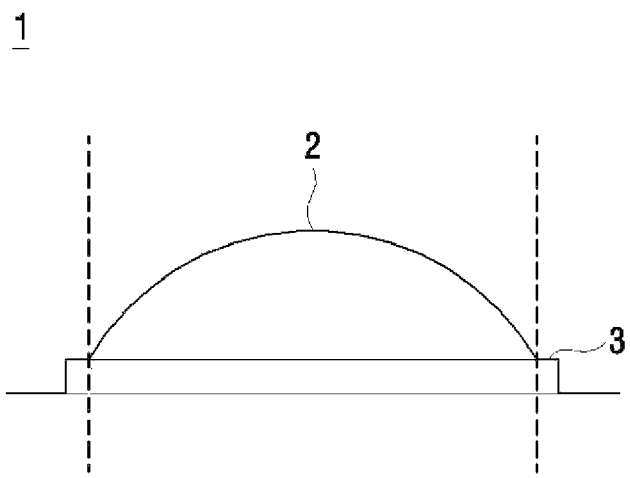
FIG. 8 is a cross sectional view illustrating a separated film according to the present invention.

FIG. 8 is a cross sectional view illustrating the separated film 1. The film 1 separated from the forming jig 310 and the fixing jig 110 by the cutting part 500 may include, but is not limited to, a flat portion 3 which lies pressed between the upper part 111 and the lower part 112 of the fixing jig 110, and a curved portion 2 which corresponds to the center of the flat portion 3 and may elongate by a humidification heat treatment and is heat-treated and protruded after it has been formed by the forming jig 310.

The cutting part 500 may separate the curved portion 2 by emitting a laser beam toward a boundary portion between the curved portion 2 and the flat portion 3. The thusly separated curved portion 2 of the film 1, subsequently, may be attached to the lens. Since any pressing and elongation are not necessary during the attachment to the lens as compared to the conventional technology, the thickness of the film 1 can be maintained even.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

The present invention is directed to a polarized lens film production apparatus and method the thickness of which is smaller than 0.04 mm, which can be used in a product, for example, a lens or sunglasses which may be formed of a polarizing lens film, so the present invention has a high industrial applicability.

What is claimed is:

1. A polarized lens film production apparatus, comprising:
    a humidification heat treatment chamber configured to transfer a film engaged to a ring-shaped fixing jig and heat-treat the film under a humidification environment to elongate the exposed film at a center portion of the fixing jig;
    a forming section which forms the elongated film to have a predetermined curvature by inserting a forming jig into the fixing jig;
    a heat treatment chamber configured to harden the film by a heat treatment, while transferring the fixing jig and the forming jig engaged to the fixing jig; and
    a cutting section to remove unnecessary portions by cutting the film, thus obtaining a polarizing lens film having the predetermined curvature,
    wherein the humidification heat treatment chamber comprises:
        a first mover configured to move the fixing jig within a first treatment room;
        a humidifier which maintains a relative humidity in the first treatment room at 90 to 100%; and
        a first heater which maintains a temperature of the first treatment room at 30 to 40° C., wherein the first mover is configured to cause a step-by-step displacement in a horizontal direction by sequentially receiving the fixing jigs, and move upward or downward after the displacement in the horizontal direction.

2. The apparatus of claim 1, wherein the fixing jig comprises:
    a ring-shaped upper part including steps at a lower surface thereof;
    a lower part including upper side steps that are tooth-engaged with the steps of the lower surface of the upper part, by which the lower part is engaged with the upper part, thus fixing the film between the upper part and the lower part; and
    a pair of clamps to fix the upper part and the lower part.

3. The apparatus of claim 1, wherein the first mover comprises:
    a plurality of first upper chain wheels disposed in two rows at an inner upper portion of the first treatment room;
    a plurality of first lower chain wheels disposed in two rows at an inner lower portion of the first treatment room; and
    a pair of first chains which are wound around the first upper chain wheels and the first lower chain wheels and are configured to transfer in stages a first fixing bar, by which the fixing jig is hooked and fixed, in a transfer direction of the horizontal direction, wherein the pair of the first chains are configured to transport the fixing jig upward or downward during the step-by-step transfer in the transfer direction.

4. The apparatus of claim 3, wherein a front first lower chain wheel disposed at a front-most end and a rear first lower chain wheel disposed at a rear-most end among the first lower chain wheels are disposed lower than other first lower chain wheels, and the fixing jig transferred to the rear first lower chain wheel is transferred to the front first lower chain wheel, and
    wherein a first door is disposed at the first treatment room for loading or unloading the fixing jig.

5. The apparatus of either claim 1 or claim 2, wherein the heat treatment chamber comprises:
    a second mover configured to move an assembly formed of the fixing jig and the forming jig engaged to the fixing jig within a second treatment room; and
    a second heater configured to maintain a temperature of the second treatment room at 50 to 70° C.

6. The apparatus of claim 5, wherein the second mover is configured to cause a step-by-step displacement in the horizontal direction by sequentially receiving the assembly formed of the fixing jig and the forming jig, by which the assembly is transported upward or downward after the displacement in the horizontal direction.

7. The apparatus of claim 5, wherein the second mover comprises:
    a plurality of second upper chain wheels disposed in two rows at an inner upper portion of the second treatment room;
    a plurality of second lower chain wheels disposed in two rows at an inner lower portion of the second treatment room; and
    a pair of second chains which are wound around the second upper chain wheels and the second lower chain wheels and are configured to transfer in stages a second fixing bar, by which the fixing jig is hooked and fixed, in a transfer direction of the horizontal direction, wherein the pair of the second chains are configured to transport the assembly formed of the fixing jig and the forming jig upward or downward during the step-by-step transfer in the transfer direction.

8. The apparatus of claim 7, wherein a front second lower chain wheel disposed at a front-most end and a rear second lower chain wheel disposed at a rear-most end among the second lower chain wheels are disposed lower than other second lower chain wheels, and the assembly formed of the fixing jig and the forming jig transferred to the rear second lower chain wheel is transferred to the front second lower chain wheel, and wherein a second door is disposed at the second treatment room for loading or unloading the assembly formed of the fixing jig and the forming jig.

9. The apparatus of claim 2, wherein the forming section is configured to engage, to the fixing jig, the forming jig which is inserted in an inner diameter of the ring-shaped fixing jig and is configured to form the predetermined curvature of the film.

10. The apparatus of claim 9, wherein the forming jig comprises:

a circular plate-shaped insertion part which is inserted in the inner diameter of the fixing jig; and a curvature part having the predetermined curvature that protrudes from a top of the insertion part and abutting a lower surface of the film.

11. The apparatus of claim 9, wherein the cutting section is configured to separate the forming jig from the fixing jig and separate the film from the fixing jig, and wherein the cutting section cuts a boundary between a curved portion and a flat portion of the film by a laser.

\* \* \* \* \*